UNITED STATES PATENT OFFICE.

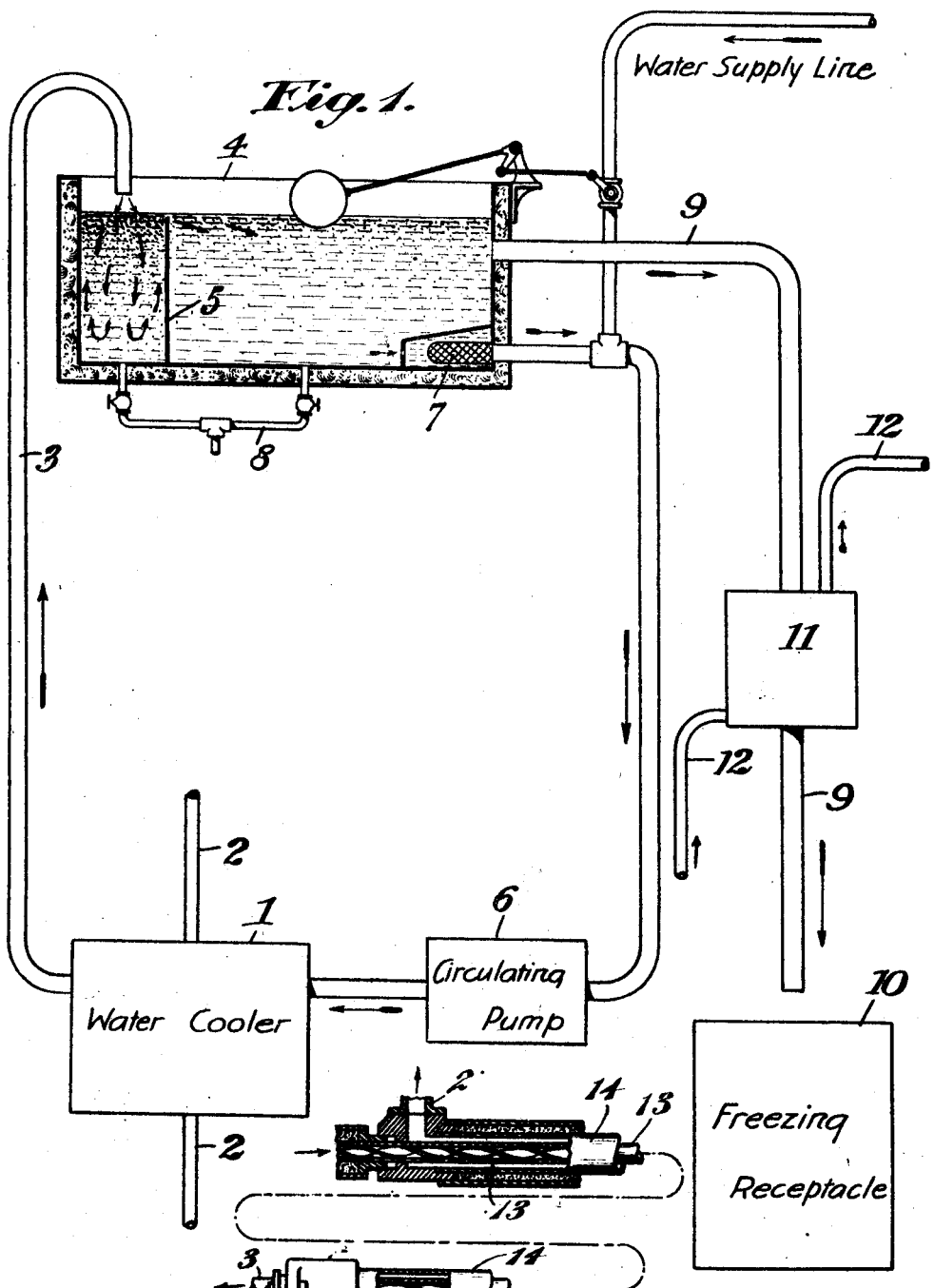

FRED OPHULS, OF NEW YORK, N. Y., ASSIGNOR TO HILL-OPHULS-PRINDLE CORP., OF NEW YORK, N. Y., A CORPORATION OF NEW YORK.

METHOD OF ICE MANUFACTURE.

1,195,495. Specification of Letters Patent. Patented Aug. 22, 1916.

Application filed November 11, 1913, Serial No. 800,268. Renewed October 26, 1915. Serial No. 58,070.

*To all whom it may concern:*

Be it known that I, FRED OPHULS, a citizen of the United States, residing at 323 Lenox road, borough of Brooklyn, city and State of New York, have invented the following-described Improvements in Methods of Ice Manufacture, of which the following is a full, true, and complete specification.

The invention provides a method of manufacturing marketable ice, either from distilled or raw water, more quickly and efficiently than heretofore. The method comprehends the artificial freezing of a mixture, or slush, of ice particles and water, which mixture is produced continuously or otherwise in such relative proportions of solid and liquid as may be found most efficient for the purposes in hand, and as hereinafter set forth.

In the accompanying drawing Figure 1 I have indicated in simple diagram an arrangement of apparatus adapted to carry on the said method, it being understood however that other types of apparatus may be used to produce the same results. Fig. 2 represents more or less schematically a suitable type of water-cooler.

In using the apparatus shown, the ice slush, or mixture of ice particles and water, is produced by first passing water, raw or distilled, through a cooler 1, in which it is cooled, while in motion, to a temperature below its freezing point, say 26° Fahr. This water cooler may be of any design suited to cool water rapidly and continuously without permitting it to freeze in the cooler or while in transit through it. A film water cooler is suitable for the purpose provided the water is passed through it under such conditions as to prevent the formation of an ice film on the interior of its water-conducting passages, and it is desirable in any event to keep the stream of water passing through the cooler under sufficient commotion to insure that practically all of it comes in contact with the walls of the passages, so that the cooling will be homogeneous. As a useful means for the purpose, I have found that longitudinally twisted strips of flat metal inserted in the pipes of a coil cooler serve to distribute the water passing therethrough in such a way that it emerges homogeneously cooled. The refrigerating medium for the cooler is represented as circulating through the same by way of the pipes marked 2, and such medium may be a brine solution or a refrigerant produced in any type of refrigerating system, and circulated in any appropriate manner, it being immaterial to the present invention how the heat is abstracted from the water in the water cooler, so long as the water issuing therefrom is below the freezing point. At the same time it should be understood that the temperature of the water is above that critical point at which, under the conditions which are peculiar to the particular apparatus, it will spontaneously flash into crystals. According to the physical characteristics of the apparatus employed, a temperature of say 30° F. or even 26° F. can be maintained without flashing. The cooled water is conducted by a pipe 3 to a tank 4, which is jacketed with heat-insulating material and divided by a partition 5 into two compartments. The pipe 3 delivers the cooled water from the water cooler into the smaller of the compartments, from which it overflows into the larger compartment and from thence is drawn off by the circulating pump 6 and returned to the cooler; a circulation of cooled water being thus established.

The cooled water entering the first compartment, and being already below 32° F., is allowed to crystallize or freeze therein, the crystallization being induced in the first instance by the contact with the water of a piece of ice placed in it for the purpose, or otherwise, and, when once started is continuous. The ice crystals form a fine-grained slush which overflows into the second compartment where it tends to mass near the surface, while solid impurities tend to settle toward the bottom. A fine sieve or strainer 7 in the large compartment and at a sufficient distance below the required level, serves to obstruct the passage of the crystals to the pump, while the connections 8 from the bottoms of both compartments serve to drain away the settlings. The slush accumulating in the larger compartment is conducted under its own head, or otherwise, through a pipe 9 and deposited in the can 10 or other receptacle in which it is to be frozen, and where it will freeze into dense clear ice with greater or less celerity according to the proportion of ice crystals it contains, a larger proportion forming into solid ice correspondingly quicker than a smaller proportion. The appropriate thickness of the slush can be readily determined in each case according to the results desired, and can be controlled by regulating the distance of the pipe connection 9 below the level in the slush tank, or otherwise, as will be obvious.

It is within the invention to form the slush either with the water from which the crystals have been formed, that is, with their own water, or to substitute fresh water therefor. The individual ice crystals will, of course, be pure and free from imprisoned solids but it may sometimes be desirable to rinse them in fresh or distilled water prior to their introduction to the freezing receptacle. This is especially the case when the crystals are formed of raw water. The agitation in the smaller compartment tends to prevent attachment of foreign matter to the crystals and the settling allowed in the larger compartment tends further to facilitate the separation of dirt and the production of slush which is relatively pure water, but when such cleansing operations are not of themselves sufficient, as likely to be the case with raw water, the crystals may be subjected to a supplementary rinsing after they leave the slush tank. This may be accomplished in a variety of ways, either continuously or intermittently as desired. For purpose of illustration, the part marked 11 in the diagram may be assumed to be a rinsing apparatus suitable for the purpose and into which the mass of crystals, as thick as possible, is introduced while a supply of distilled water, cooled to 32° is forced through it from a pipe 12, after which the slush is allowed to pass on through the pipe 9 to the freezing receptacle, together with such proportion of the distilled rinsing water as may be necessary or desired. The same operation may obviously be carried on continuously, as for example by mechanically advancing the crystal mass in a worm conveyer and against a counter-current of the distilled, cooled rinsing water. Any suitable refrigerating medium can be employed for freezing the slush in the cans 10, the same as that used for the cooler, or otherwise. The water abstracted from the circulation system in the form of ice crystals or slush is made up from a supply pipe 13 connected with the intake of the circulating pump and controlled by a regulator, such as the ball-float valve indicated in the diagram. The level in the slush tank is thus maintained constant.

The type of water-cooler illustrated in Fig. 2, comprises an inner water pipe 13, containing the twisted metal strips referred to and coiled or looped in any desired number of limbs, indicated by the dotted line. This pipe is surrounded by an exterior pipe 14 for the brine or other refrigerant, the latter entering the said pipe at the end adjacent the outlet of the water pipe and leaving adjacent the water inlet. The process is in no sense confined to the use of apparatus such as just described and any suitable means can be employed for supercooling the water. Nor is there any limitation upon the invention in respect to the manner of artificially freezing the water and crystals.

I claim—

1. The method of making ice which consists in cooling water to a temperature of less than 32° F. without freezing it, thereafter permitting the formation of ice crystals therein, removing such ice crystals and a portion of the water and artificially freezing the water with the crystals therein.

2. The method of making artificial ice which consists in circulating water through a water cooler and a crystal-forming receptacle, cooling the water while passing through the cooler, to less than 32° F. without freezing, whereby it enters the receptacle at less than 32° F., inducing or permitting the formation of ice crystals in the super-cooled water in such receptacle, deflecting the crystals from the water returning to the cooler, and subjecting such crystals in water to a freezing temperature to form a solid cake of ice therefrom.

3. The method of making ice which consists in continuously circulating water through a water cooler and a crystal-forming receptacle, cooling the water passing through the cooler to below 32° F. without freezing, inducing or permitting the formation of ice crystals in the super-cooled water in the receptacle, separating the greater part of the water from such crystals for return to the cooler, adding more water to such separated water and then subjecting the said crystals in water to a freezing temperature to form a solid cake of ice therefrom.

In testimony whereof, I have signed this specification in the presence of two witnesses.

FRED OPHULS.

Witnesses:
Geo. Elliott Patterson,
William Brann.